United States Patent
Wang et al.

(10) Patent No.: US 12,190,840 B2
(45) Date of Patent: Jan. 7, 2025

(54) ELECTRONIC DEVICE AND IMAGING METHOD THEREOF

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Yingming Liu, Beijing (CN); Yapeng Li, Beijing (CN); Yangbing Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/297,663

(22) PCT Filed: Jul. 24, 2020

(86) PCT No.: PCT/CN2020/104533
§ 371 (c)(1),
(2) Date: May 27, 2021

(87) PCT Pub. No.: WO2021/013253
PCT Pub. Date: Jan. 28, 2021

(65) Prior Publication Data
US 2022/0086378 A1     Mar. 17, 2022

(30) Foreign Application Priority Data
Jul. 25, 2019   (CN) .......................... 201910677917.8

(51) Int. Cl.
*G09G 3/36* (2006.01)
*G09G 3/32* (2016.01)

(52) U.S. Cl.
CPC ............. *G09G 3/3648* (2013.01); *G09G 3/32* (2013.01); *G09G 2300/0426* (2013.01); *G09G 2354/00* (2013.01)

(58) Field of Classification Search
CPC ................... G09G 3/32; G09G 3/3648; G09G 2300/0426; G09G 2354/00; G06V 40/13–145
See application file for complete search history.

(56) References Cited

U.S. PATENT DOCUMENTS 10,043,050 B2 *  8/2018  Huang .................... G06F 3/045
10,043,051 B2 *  8/2018  Huang .................... H04N 23/55
(Continued)

FOREIGN PATENT DOCUMENTS

| CN | 107958145 | 4/2018 |
| CN | 107958193 | 4/2018 |
| CN | 110400812 | 11/2018 |

OTHER PUBLICATIONS

Chinese First Office Action (w/ English translation) for corresponding CN Application No. 201910677917.8, dated Mar. 1, 2021, 13 pages.

(Continued)

*Primary Examiner* — Gene W Lee
(74) *Attorney, Agent, or Firm* — Dority & Manning, P.A.

(57) ABSTRACT

An electronic device includes a pixel layer, an image display control apparatus, a photosensitive layer, and a processor. The pixel layer includes a plurality of pixel units configured to display an image. The image display control apparatus is configured to control the plurality of pixel units to sequentially display at least one corresponding first image according to at least one first image signal. The photosensitive layer is configured to receive a reflected light formed after an emergent light emitted from the pixel layer when displaying one first image at each time is reflected by an object to be (Continued)

photographed, and to convert the reflected light received at each time into a second image signal. The processor is configured to determine an image of the object to be photographed according to the at least one first image signal and second image signals corresponding to the at least one first image signal.

8 Claims, 9 Drawing Sheets

(56) References Cited

U.S. PATENT DOCUMENTS

| | | | | |
|---|---|---|---|---|
| 10,268,884 | B2 * | 4/2019 | Jones | A61B 5/0059 |
| 10,296,777 | B2 * | 5/2019 | Du | G06V 10/145 |
| 10,387,711 | B2 * | 8/2019 | Huang | H01L 27/14609 |
| 10,607,060 | B2 * | 3/2020 | Lee | G06V 10/22 |
| 10,777,624 | B2 * | 9/2020 | Gao | G06V 40/1365 |
| 10,817,695 | B2 * | 10/2020 | Huang | G06F 3/044 |
| 10,915,724 | B2 * | 2/2021 | Small | G06V 10/26 |
| 11,017,202 | B2 * | 5/2021 | Kim | G06V 40/1347 |
| 11,656,700 | B2 * | 5/2023 | Zhang | H04M 1/0264 |
| | | | | 345/175 |
| 2014/0036168 | A1 | 2/2014 | Ludwig | |
| 2016/0202178 | A1 | 7/2016 | Acosta et al. | |
| 2017/0220844 | A1 * | 8/2017 | Jones | G06F 1/1684 |
| 2017/0257534 | A1 * | 9/2017 | Huang | G06F 3/042 |
| 2017/0372113 | A1 * | 12/2017 | Zhang | H10K 59/12 |
| 2018/0005007 | A1 * | 1/2018 | Du | H10K 30/88 |
| 2018/0074627 | A1 * | 3/2018 | Kong | G06V 40/1318 |
| 2018/0173926 | A1 | 6/2018 | Wang et al. | |
| 2018/0342052 | A1 * | 11/2018 | Higuchi | G06V 40/13 |
| 2020/0085315 | A1 * | 3/2020 | Kang | A61B 5/6898 |
| 2020/0184178 | A1 | 6/2020 | Zhou | |
| 2020/0203434 | A1 * | 6/2020 | Steudel | G06F 3/0421 |
| 2020/0226341 | A1 | 7/2020 | He et al. | |
| 2022/0012452 | A1 * | 1/2022 | Li | G06F 21/32 |

OTHER PUBLICATIONS

Chinese Decision of Rejection (w/ English translation) for corresponding CN Application No. 201910677917.8, dated Sep. 27, 2021, 9 pages.

PCT International Search Report for corresponding PCT Application No. PCT/CN2020/104533, mailed on Oct. 29, 2020, 4 pages.

* cited by examiner

ELECTRONIC DEVICE AND IMAGING METHOD THEREOF

CROSS-REFERENCE TO RELATED APPLICATIONS

This application is a national phase entry under 35 USC 371 of International Patent Application No. PCT/CN2020/104533 filed on Jul. 24, 2020, which claims priority to Chinese Patent Application No. 201910677917.8, filed with the Chinese Patent Office on Jul. 25, 2019, titled "DISPLAY PANEL, ELECTRONIC DEVICE, AND IMAGING METHOD FOR DISPLAY PANEL", which are incorporated herein by reference in their entirety.

TECHNICAL FIELD

The present disclosure relates to the field of display technologies, and in particular, to an electronic device and an imaging method thereof.

BACKGROUND

In recent years, with the development of science and technology, an era of Internet of Things in which everything is interconnected is coming. An electronic device (e.g. a mobile phone), as a data acquisition platform with extremely high popularity, is increasingly required to be integrated with various sensors, so as to meet various needs of people by combing data acquisition of the sensors with display of a display panel.

Still in an example where the electronic device is the mobile phone, an important data acquisition device in the mobile phone is a camera. At present, cameras used in mobile phones all have complex and precise optical lenses, and the volume of the optical lens is difficult to be reduced. Therefore, an imaging method of reducing the volume of the optical lense, or even a lensless imaging method in which the optical lense is removed have always been focuses and difficulties of miniaturization of the camera.

SUMMARY

In one aspect, an electronic device is provided. The electronic device includes a pixel layer, an image display control apparatus, a photosensitive layer, and a processor. The pixel layer includes a plurality of pixel units configured to display an image. The image display control apparatus is electrically connected to the pixel layer, and is configured to control the plurality of pixel units in the pixel layer to sequentially display at least one corresponding first image according to at least one first image signal. The photosensitive layer is located on a side of the pixel layer facing away from a light-exit side of the pixel layer. The photosensitive layer is configured to receive a reflected light formed after an emergent light emitted from the pixel layer when displaying one first image at each time is reflected by an object to be photographed, and to convert the reflected light received at each time into a second image signal. The processor is electrically connected to the photosensitive layer, and is configured to determine an image of the object to be photographed according to the at least one first image signal and second image signals corresponding to the at least one first image signal.

In some embodiments, the electronic device further includes a base. Each pixel unit includes a pixel circuit and a light-emitting unit that are stacked on the base, and the pixel circuit is configured to drive the light-emitting unit to emit light.

In some embodiments, the light-emitting unit is closer to the photosensitive layer relative to the pixel circuit. The light-emitting unit includes a first electrode layer, a light-emitting functional layer and a second electrode layer that are sequentially arranged in a direction towards the photosensitive layer. The second electrode layer is capable of reflecting light, and the second electrode layer is provided with first light-transmitting portions configured to transmit the reflected light. The base is a transparent base, and/or the base is provided with second light-transmitting portions configured to transmit the reflected light and the emergent light.

In some embodiments, the electronic device further includes an encapsulation substrate disposed on a side of the photosensitive layer facing away from the pixel layer.

In some embodiments, the pixel circuit is closer to the photosensitive layer relative to the light-emitting unit. The light-emitting unit includes a first electrode layer, a light-emitting functional layer and a second electrode layer that are sequentially arranged in a direction away from the photosensitive layer, and the second electrode layer is capable of transmitting light. The photosensitive layer is disposed between the base and the pixel layer. Or, the photosensitive layer is disposed on a side of the base away from the pixel layer. The base is a transparent base, and/or the base is provided with second light-transmitting portions configured to transmit the reflected light.

In some embodiments, in a case where the photosensitive layer is disposed on the side of the base away from the pixel layer, the electronic device further includes a protective layer disposed on a side of the photosensitive layer away from the base.

In some embodiments, the electronic device further includes an encapsulation layer disposed on a side of the pixel layer away from the photosensitive layer.

In some embodiments, the photosensitive layer includes a plurality of photosensitive elements. An orthographic projection of each photosensitive element on a plane where the pixel layer is located is located between two adjacent pixel units.

In some embodiments, the processor is further configured to sequentially output the at least one first image signal to the image display control apparatus when receiving an image acquisition signal.

In some embodiments, the processor is further configured to transmit the image of the object to be photographed to the image display control apparatus after determining the image of the object to be photographed. The image display control apparatus is further configured to control the pixel layer to display the determined image of the object to be photographed.

In some embodiments, each first image signal is a preset image signal.

In some embodiments, the image display control apparatus is further configured to control the plurality of pixel units to sequentially display at least two corresponding first images according to at least two different first image signals.

In some embodiments, each pixel unit includes a plurality of sub-pixel units. The image display control apparatus is configured to control the plurality of pixel units to sequentially display two corresponding first images according to two first image signals. The electronic device has 0 to N levels of gray scales, and a sum of gray scales corresponding to a same sub-pixel unit in the two first images is N, here, N is a maximum gray scale.

In some embodiments, a first image signal in the at least one first image signal is a Hadamard matrix signal.

In another aspect, an imaging method of an electronic device is provided. The electronic device includes a pixel layer and a photosensitive layer. The pixel layer includes a plurality of pixel units configured to display an image. The photosensitive layer is located on a side of the pixel layer facing away from a light-exit side of the pixel layer. The imaging method includes: controlling the plurality of pixel units in the pixel layer in the electronic device to sequentially display at least one corresponding first image according to at least one first image signal, so that the photosensitive layer receives a reflected light formed after an emergent light emitted from the pixel layer when displaying one first image at each time is reflected by an object to be photographed, and converts the reflected light received at each time into a second image signal; and determining an image of the object to be photographed according to the at least one first image signal and second image signals corresponding to the at least one first image signal.

In some embodiments, the imaging method further includes: supplying power to the photosensitive layer in the electronic device when receiving an image acquisition signal, so as to make the photosensitive layer in a working state.

In some embodiments, each first image signal is a preset image signal.

In some embodiments, controlling the plurality of pixel units in the pixel layer in the electronic device to sequentially display the at least one corresponding first image according to the at least one first image signal, includes: controlling the plurality of pixel units in the pixel layer to sequentially display at least two corresponding first images according to at least two different first image signals.

In some embodiments, each pixel unit includes a plurality of sub-pixel units. The at least two different first image signals include two first image signals. The at least two first images are two first images. The electronic device has 0 to N levels of gray scales, and a sum of gray scales corresponding to a same sub-pixel unit in the two first images is N, here, N is a maximum gray scale.

BRIEF DESCRIPTION OF THE DRAWINGS

In order to describe technical solutions in the present disclosure more clearly, accompanying drawings to be used in some embodiments of the present disclosure will be briefly introduced below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
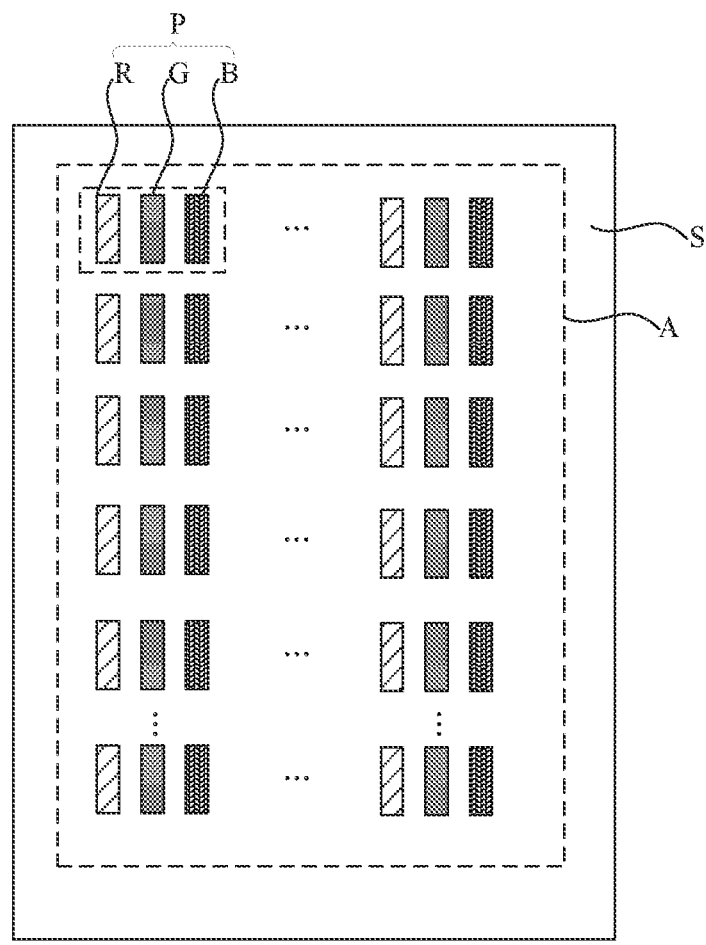
FIG. 1 is a top structural view of a display panel in an electronic device in accordance with some embodiments.

The technical solutions in some embodiments of the present disclosure will be described below clearly and completely with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "an example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined by "first" or "second" may explicitly or implicitly include one or more of the features. In the description of the embodiments of the present disclosure, the term "a/the plurality of" means two or more unless otherwise specified.

In the description of some embodiments, the terms "coupled" and "connected" and their extensions may be used. For example, the term "connected" may be used in the description of some embodiments to indicate that two or more components are in direct physical or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B, and C" has the same meaning as the phrase "at least one of A, B, or C", and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is, optionally, construed as "when" or "upon" or "in response to determining" or "in response to detecting", depending on the context. Similarly, the phrase "if it is determined" or "if [a stated condition or event] is detected" is, optionally, construed as "upon determining" or "in response to determining" or "upon detecting [the stated condition or event]" or "in response to detecting [the stated condition or event]", depending on the context.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and regions are enlarged for clarity. Thus, variations in shapes relative to the accompanying drawings due to, for example, manufacturing techniques and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

The embodiments of the present application are described below in detail. Examples of the embodiments are shown in the accompanying drawings. Same or similar reference numerals consistently indicate same or similar elements, or elements with same or similar functions. The embodiments to be described below with reference to the accompanying drawings are exemplary, and are only used to explain the present application, and cannot be construed as limitations on the present application.

At present, with the development of smart electronic devices (e.g., mobile phones), screens (i.e., display panels) may be said to be most indispensable terminal devices for people. A screen is integrated with various sensors, which may be used as both an output terminal and an input terminal for information, and may also be used as the output terminal or the input terminal for information.

Some embodiments of the present disclosure provide an electronic device integrated with a lensless image capture sensor. The electronic device may be, for example, a smart phone, a tablet computer, an outdoor electronic display screen, or an automatic teller machine (ATM).

As shown in FIG. 1, a display panel in the electronic device has an active area (AA) A and a peripheral area S located outside the active area A. As shown in FIG. 1, the present embodiments are illustrated in an example where the peripheral area S is arranged around the active area A.

Figure 2:
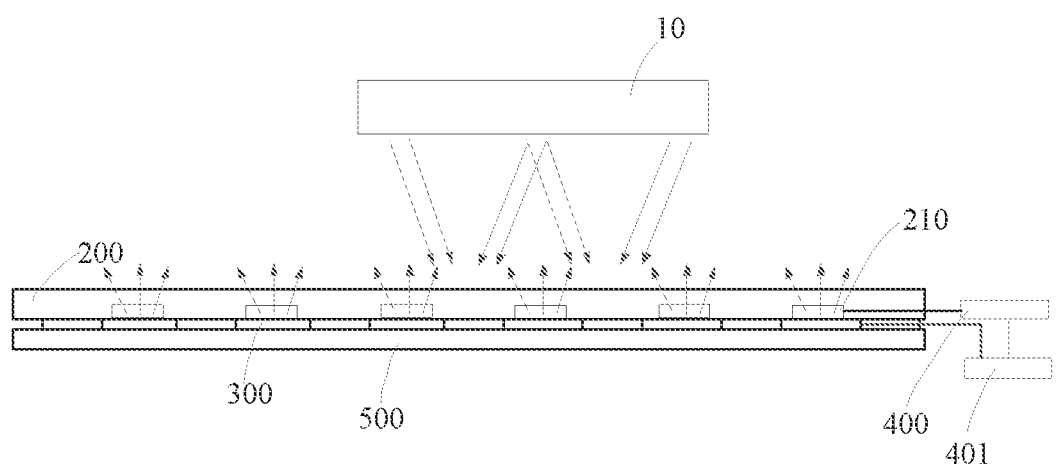
FIG. 2 is a sectional structural view of an electronic device in accordance with some embodiments.

As shown in FIG. 2, the electronic device may include a pixel layer 200, a photosensitive layer 300, an image display control apparatus 400, and a processor 401.

As shown in FIGS. 1 and 2, the pixel layer 200 includes a plurality of pixel units P, and the plurality of pixel units P are located in the active area A, and are configured to display an image. The image display control apparatus 400 is electrically connected to the pixel layer 200, and may be located in the peripheral area S, and is configured to control the plurality of pixel units P in the pixel layer 200 to sequentially display at least one first image corresponding to an emergent light (with a preset brightness and a preset color) emitted from the plurality of pixel units P at each time according to at least one first image signal. Since a light modulator may change an intensity of a light wave, and may further modulate a phase and a polarization state of the light wave, the light modulator is applied to digital adjustment of optical communication. Moreover, in the present embodiments, since the image display control apparatus 400 controlling the plurality of pixel units P in the pixel layer 200 to sequentially display the at least one first image corresponding to the emergent light emitted from the plurality of pixel units P at each time according to the at least one first image signal may be regarded as a process of modulating the emergent light emitted from the plurality of pixel units P, the image display control apparatus 400 may also be referred to as the light modulator.

The photosensitive layer 300 is located on a side of the pixel layer 200 facing away from a light-exit side of the pixel layer 200, and may be located in the active area A and extend to the peripheral area S. The photosensitive layer 300 is configured to receive a reflected light formed after the emergent light emitted from the pixel layer 200 when displaying one first image at each time is reflected by an object to be photographed 10 (e.g., a physical object), and to convert the reflected light received at each time into a second image signal and send the second image signal to the processor 401. The processor 401 is electrically connected to the photosensitive layer 300, and may also be located in the peripheral area S, and is configured to determine an image of the object to be photographed 10 according to the at least one first image signal and the second image signals corresponding to the at least one first image signal.

For example, the first image signal may include a pixel value of each of the plurality of pixel units P, and the pixel layer 200 may display images (i.e., screens) corresponding to these pixel values. The pixel value may include, for example, gray scales of a red sub-pixel R, a green sub-pixel G, and a blue sub-pixel B, and may also be other values such as YCbCr.

Figure 3:
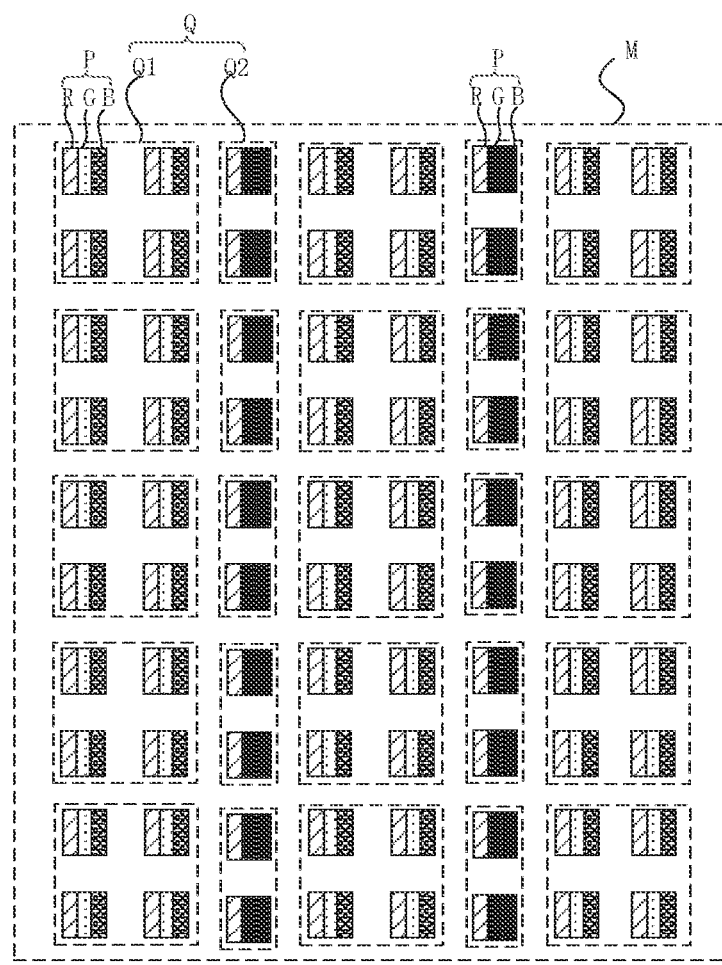
FIG. 3 is a structural diagram of a preset pattern displayed on a pixel layer in accordance with some embodiments.

In some embodiments, each of the at least one first image signal may be a preset image signal. That is, as shown in FIG. 3, the first image corresponding to each first image signal has a preset pattern M. For example, the preset pattern M may be a light and dark pattern. That is, the preset pattern M includes a plurality of pattern blocks Q distributed in a two-dimensional direction (e.g., including a row direction and a column direction that are perpendicular to each other), and each pattern block Q corresponds to at least one pixel unit P. In a case where each pattern block Q corresponds to a plurality of pixel units P the pixel values of these pixel units P are the same. In the row direction and in the column direction, pixel values of every two adjacent pattern blocks Q are different. The pixel value of the pattern block Q refers to the pixel value of any pixel unit P in the pattern block Q.

That is, the plurality of pixel units P may be distributed in an array to form the pixel layer 200. For example, the pixel unit P includes the red sub-pixel R, the green sub-pixel G, and the blue sub-pixel B, and sub-pixels of other colors are not excluded.

Further, as shown in FIG. 3, the plurality of pattern blocks Q include a plurality of first pattern blocks Q1 and a plurality of second pattern blocks Q2 that are alternately distributed in the row direction and/or in the column direction. Y values (brightness values) corresponding to the pixel values of the first pattern blocks Q1 are the same, Y values corresponding to the pixel values of the second pattern blocks Q2 are the same, and the Y value corresponding to the pixel value of the first pattern block Q1 is different from the Y value corresponding to the pixel value of the second pattern block Q2. In this case, the preset pattern M may be a binary encoded pattern that is able to be encoded with 0 and 1.

Figure 4:
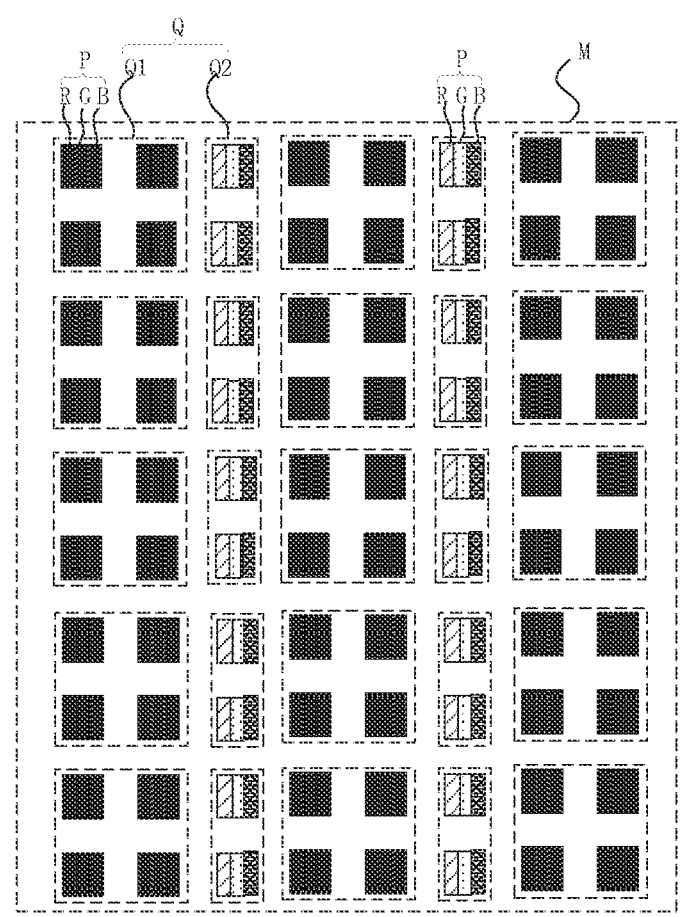
FIG. 4 is a structural diagram of a preset pattern displayed on a pixel layer n accordance with some other embodiments.
Figure 5:
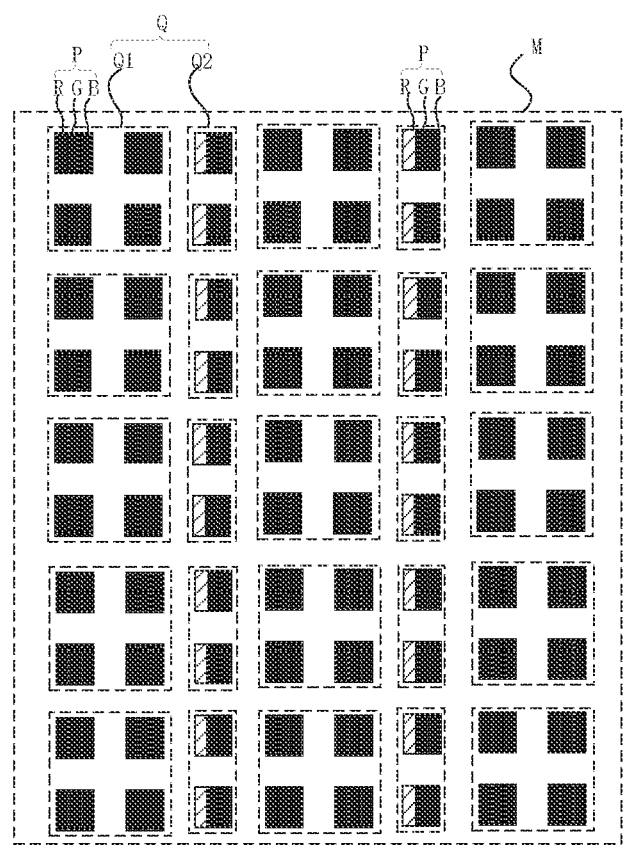
FIG. 5 is a structural diagram of a preset pattern displayed on a pixel layer in accordance with yet other embodiments.

For example, as shown in FIG. 4, the first pattern block Q1 corresponds to a black screen. That is, the brightness value corresponding to the pixel value of the first pattern block Q1 is a minimum brightness value, which may correspond to a value of 0 in binary encoding during an encoding. The second pattern block Q2 corresponds to a white screen. That is, the brightness value corresponding to the pixel value of the second pattern block Q2 is a maximum brightness value, which corresponds to a value of 1 in binary encoding during the encoding. Of course, as shown in FIG. 5, the second pattern block Q2 may also be a red screen (That is, a brightness value corresponding to a pixel value of the red sub-pixel of each pixel unit P in each second pattern block Q2 is a maximum brightness value, and brightness values corresponding to pixel values of the green sub-pixel G and the blue sub-pixel B are minimum brightness values).

Figure 6:
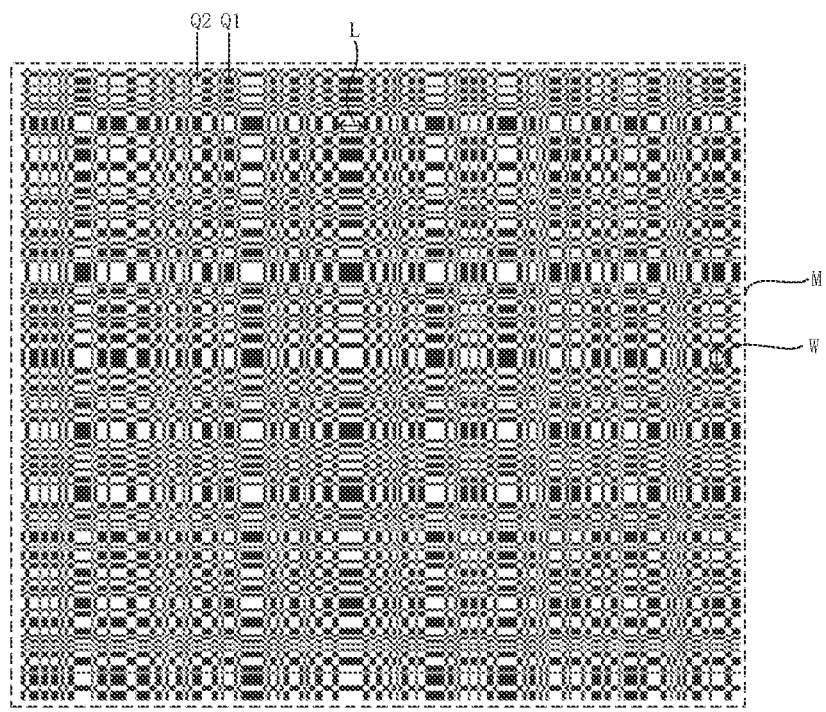
FIG. 6 is a structural diagram of a preset pattern displayed on a pixel layer in accordance with yet other embodiments.

In a case where the first pattern block Q1 corresponds to the black screen and the second pattern block Q2 corresponds to the white screen, the pixel unit(s) P in the first pattern block Q1 are not lit, and the pixel unit(s) P in the second pattern block Q2 are lit. In this case, FIG. 6 is a structural diagram of another possible preset pattern M. Widths W (dimensions in the column direction) of each first pattern block Q1 and each second pattern block Q2 that are in a same row are the same, and lengths L (dimensions in the row direction) of each first pattern block Q1 and each second pattern block Q2 that are in a same column are the same.

Therefore, adjacent lit pixel units P have a certain distance therebetween, which may effectively reduce noises caused by light crosstalk and reduce errors. In addition, the light and dark preset pattern that the first image displayed on the pixel layer 200 has is used to irradiate the object to be photographed 10, and the reflected light corresponding to the first image is formed through the reflection of the object to be photographed 10. The reflected light returns to the electronic device, and is received by the photosensitive layer 300 in the electronic device. As with an imaging principle of using a special mask (including a plurality of light-transmitting portions capable of transmitting light and shielding portions incapable of transmitting light) to shield partial regions of the object to be photographed 10, during imaging, when the emergent light emitted from lit pixel units P in the preset pattern irradiates the object to be photographed 10, the reflected light formed through the reflection of the object to be photographed 10 is received by the photosensitive layer 300. Unlit pixel units P in the preset pattern are in a dark state, and thus no light irradiates the object to be photographed 10, and in this case, no reflected light is received by the photosensitive layer 300. That is, portions of the object to be photographed 10 that are not irradiated by light may be regarded as portions of the object to be photographed 10 that are shielded by the shielding portions of the mask, and portions of the object to be photographed 10 that are irradiated by light may be regarded as portions of the object to be photographed 10 that correspond to the light-transmitting portions of the mask.

Thus, during imaging, the reflected light emitted from the object to be photographed 10 (i.e., the portions of the object to be photographed 10 that correspond to the light-transmitting portions of the mask) is received by the photosensitive layer 300, and the photosensitive layer 300 converts this part of reflected light into the second image signal (each second image signal contains both the first image signal and information of the object to be photographed 10). The above process is equivalent to a process of encoding the image of the object to be photographed 10 by using the preset pattern M that the first image has. Subsequently, a related component (e.g., the processor 401) may perform processing according to the second image signal and the first image signal corresponding to the first image (characterized as the preset pattern M), and finally the image of the object to be photographed 10 may be obtained. This process may be regarded as a process of decoding the image. The first image signal corresponding to the preset pattern M may be pre-stored in the processor 401.

Since the first image with the preset pattern M is formed by controlling the plurality of pixel units 200 to be displayed according to the first image signal, a specific preset pattern M is formed by controlling at least part of the pixel units P to be displayed with a preset brightness and a preset color.

The process of encoding the image may be regarded as a convolution operation on a matrix. That is, the convolution operation on the matrix may be regarded as a convolution operation performed on an image matrix of the object to be photographed 10 by using a mask matrix. The mask matrix is a matrix corresponding to the preset pattern, which may be composed of 0 and 1. During the convolution operation, unmasked values of 1 are processed, and masked values of 0 are not included in calculation. In the present embodiments, the values of 0 correspond to patterns, in the dark state, of light and dark patterns in the preset pattern, and the values of 1 correspond to patterns, in a bright state, of light and dark patterns in the preset pattern. During calculation, the image of the object to be photographed 10 itself may be mathematically abstracted to a matrix I, the preset pattern may be mathematically abstracted to a matrix A, and an intermediate image signal (i.e., the second image signal) may be mathematically abstracted to a matrix Y, and there is a relational expression, i.e., $Y=A*I$. Since the preset pattern M is a known matrix, and Y is also a known matrix, by reconstructing the image signal through the relational expression and then through inversion, the image of the object to be photographed 10 may be obtained, thereby achieving the imaging of the object to be photographed 10.

In the electronic device in the present embodiments, the electronic device is able to not only serve as a display device to provide an optical display of information contents, but also serve as an image capture device to capture images. Moreover, in an example where the electronic device is a mobile phone, the photosensitive layer 300 may further serve as a front image capture sensor in which an image displayed on the mobile phone is used as a light source to achieve a self-photography function of the mobile phone. In addition, compared with a large volume of an optical lens in the related art, lensless imaging may be achieved, and the structure is simple, which enables the electronic device to have characteristics of small volume and light weight. Moreover, since there is no need to use a physical optical lens, and there is no need to additionally use a mask (also referred to as a standard pattern plate) to form a standard preset pattern, lightening and thinning of the electronic device may be achieved, and user experience may be improved. In addition, based on the above imaging principle, the photosensitive layer 300 is further applicable to face recognition, gesture recognition and night vision imaging of the electronic device, or the like.

In addition, under the existing technical requirements, for example, in an electronic device such as a mobile phone and a tablet computer, a camera only occupies a small part of a display screen, and although the occupied area is small, existing usage requirements cannot be met. Besides, an existing production line of the display screen (the display panel in the electronic device) is only designed for local distribution of an image capture component in the display screen. In order to make full use of existing production equipment and existing production processes, in a case of meeting basic image capture requirements, providing the photosensitive layer 300 in the active area A of the electronic device may further reduce the area occupied by the camera and increase a screen-to-body ratio.

In some other embodiments, the processor 401 is further configured to sequentially output the at least one first image signal to the image display control apparatus 400 when receiving an image acquisition signal.

That is, the processor 401 and the image display control apparatus 400 are configured to achieve communicative interconnection therebetween, and the processor 401, as a general controller, controls the image display control apparatus 400 to control the pixel layer 200 to display an image.

In yet other embodiments, the processor 401 is further configured to transmit the image of the object to be photographed 10 to the image display control apparatus 400 after determining the image of the object to be photographed 10. The image display control apparatus 400 is further configured to control the pixel layer 200 to display the determined image of the object to be photographed 10.

That is, the image display control apparatus 400 is able to display the determined image of the object to be photographed 10 on the electronic device. For example, in the case where the electronic device is the mobile phone, the determined image of the object to be photographed 10 is displayed on a display screen of the mobile phone, and the captured image of the object to be photographed 10 may be stored in a storage unit (e.g., an album) in the mobile phone.

In some embodiments, the image display control apparatus 400 is configured to control the plurality of pixel units P to sequentially display at least two corresponding first images according to at least two different first image signals.

In the present embodiments, the image display control apparatus 400 obtains the at least two different first image signals, and at least two corresponding first images are sequentially displayed according to the at least two first image signals, and one first image corresponds to one preset pattern. Therefore, the image display control apparatus 400 may obtain one corresponding second image signal according to one first image, thereby determining an image signal of the object to be photographed 10 corresponding to the first image. By obtaining the at least two different first image signals, it is possible to irradiate the object to be photographed 10 at a plurality of times from different angles, and to obtain more comprehensive information about the object to be photographed 10, so as to obtain a clearer image. Moreover, by performing data processing on a plurality of obtained image signals of the object to be photographed 10 through a correction algorithm, an accurate image of the object to be photographed 10 may be obtained as possible.

The correction algorithm is to compare and correct a plurality of sampling results in a statistical manner to obtain a more accurate result. The specific correction algorithm is known to a person skilled in the art, which will not be repeated herein. The first image signal in the present application is able to be expressed by controlling the pixel layer 200 by the image display control apparatus 400, and the second image signal is obtained according to the emergent light emitted from the first image corresponding to the first image signal. The preset pattern displayed with the emergent light is able to be changed arbitrarily (although the preset pattern is able to be changed arbitrarily, it is a known preset pattern). The at least two first image signals are used to emit the emergent light at at least two times, and the emergent light emitted at at least two times irradiate the same object to be photographed 10 to correspondingly obtain the reflected light at at least two times, thereby obtaining at least two second image signals, which reduces image noises and errors through the correction algorithm by the processor, so as to obtain an image closer to the actual object to be photographed 10.

For example, the image display control apparatus 400 being configured to control the plurality of pixel units P to sequentially display the at least two corresponding first images according to the at least two different first image signals, may be that: the image display control apparatus 400 controls the plurality of pixel units P to display two first images at a preset frequency (e.g., a second), or controls the plurality of pixel units P to display three first images at a second, or to display a screen at a play frequency of an actual displayed display screen, such as 24 frames per second (that is, 24 first images are displayed at a second), and each first image corresponds to one preset pattern M.

In yet other embodiments, each pixel unit P includes a plurality of sub-pixel units (such as the red sub-pixel R, the green sub-pixel G, and the blue sub-pixel B in FIGS. 4 and 5). The image display control apparatus 400 is configured to control the plurality of pixel units P to sequentially display two corresponding first images according to two first image signals. The electronic device has 0 to N levels of gray scales, and a sum of gray scales corresponding to a same sub-pixel unit in the two first images is N, and N is a maximum gray scale.

Figure 7:
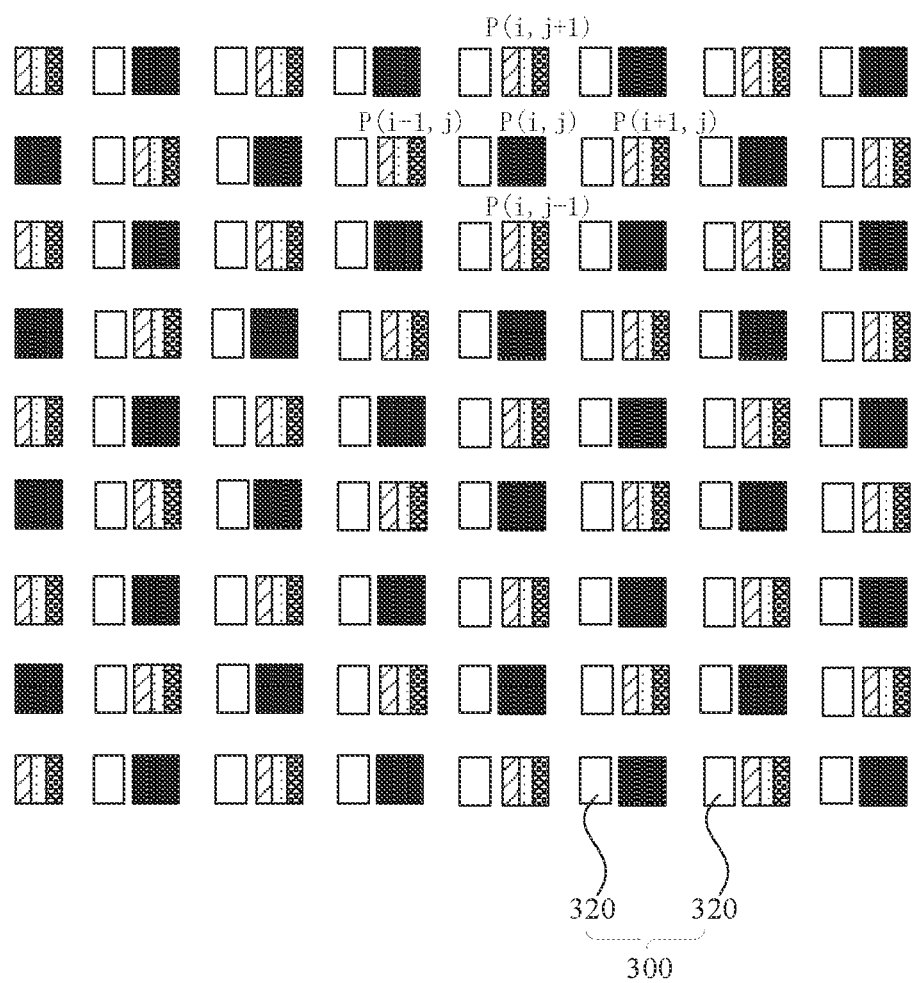
FIG. 7 is a structural diagram of a preset pattern displayed on a pixel layer in accordance with yet other embodiments.

For example, an array of pixel units P in a same region or a same region in an array of pixel units P is abbreviated as a pixel array region. FIG. 7 illustrates an example of one first image displayed in a certain pixel array region, and FIG. 8 illustrates an example of another first image displayed in the same pixel array region.

Figure 8:
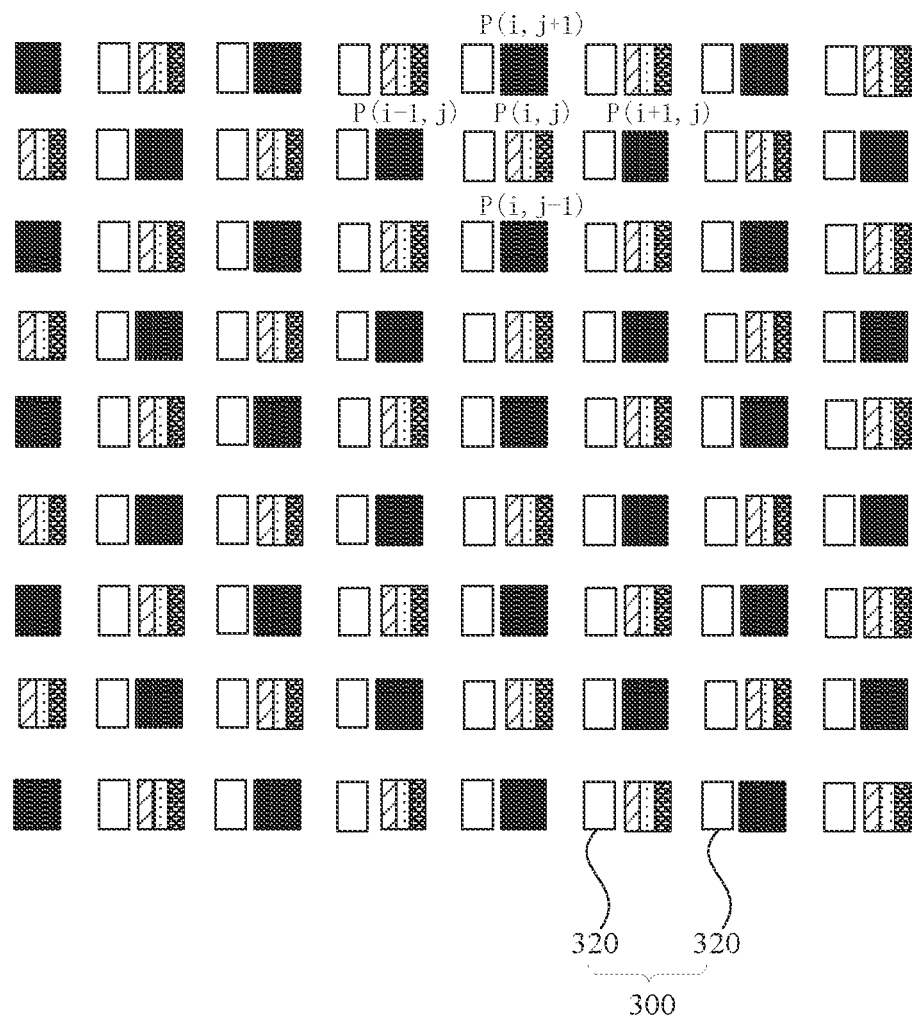
FIG. 8 is a structural diagram of a preset pattern displayed on a pixel layer in accordance with yet other embodiments.

In FIGS. 7 and 8, in an example where one of the plurality of pixel units P is represented by P(i, j), the pixel unit is denoted as a first pixel unit, the sub-pixel units in the first pixel unit are represented by the red sub-pixel R(i, j), the green sub-pixel G(i, j) and the blue sub-pixel B(i, j), respectively.

Four pixel units adjacent to the first pixel unit in the row direction and in the column direction are present in the plurality of pixel units R which are represented by P(i−1, j), P(i+1, j), P(i, j−1) and P(i, j+1). Accordingly, the sub-pixel units in P(i−1, j) are represented by the red sub-pixel R(i−1, j), the green sub-pixel G(i−1, j) and the blue sub-pixel B(i−1, j), respectively. The sub-pixel units in P(i+1, j) are represented by the red sub-pixel R(i+1, j), the green sub-pixel G(i+1, j) and the blue sub-pixel B(i+1, j), respectively. The sub-pixel units in P(i, j−1) are represented by the red sub-pixel R(i, j−1), the green sub-pixel G(i, j−1) and the blue sub-pixel B(i, j−1), respectively. The sub-pixel units in P(i, j+1) are represented by the red sub-pixel R(i, J+1), the green sub-pixel G(i, j+1) and the blue sub-pixel B(i, j+1), respectively.

In one first image, as shown in FIG. 7, in a case where gray scales of the sub-pixel units (i.e., the red sub-pixel R(i, j), the green sub-pixel G(i, j) and the blue sub-pixel B(i, j)) in the first pixel unit P(i, j) are all 0, i.e., in a case where black screens are displayed, gray scales of the sub-pixel units (i.e., the red sub-pixel R(i−1, j), the green sub-pixel G(i−1, j) and the blue sub-pixel B(i−1, j)) in P(i−1, j), the sub-pixel units (i.e., the red sub-pixel R(i+1, j), the green sub-pixel G(i+1, j) and the blue sub-pixel B(i+1, j)) in P(i+1, j), the sub-pixel units (i.e., the red sub-pixel R(i, j−1), the green sub-pixel G(i, j−1) and the blue sub-pixel B(i, j−1)) in P(i, j−1), and the sub-pixel units (i.e., the red sub-pixel R(i, j+1), the green sub-pixel G(i, j+1) and the blue sub-pixel B(i, j+1)) in P(i, j+1) are all 255, i.e., white screens are displayed.

In another first image, as shown in FIG. 8, in a case where gray scales of the sub-pixel units (i.e., the red sub-pixel R(i, j), the green sub-pixel G(i, j) and the blue sub-pixel B(i, j)) in the first pixel unit P(i, j) are all 255, i.e., in a case where white screens are displayed, gray scales of the sub-pixel units (i.e., the red sub-pixel R(i−1, j), the green sub-pixel G(i−1, j) and the blue sub-pixel B(i−1, j)) in P(i−1, j), the sub-pixel units (i.e., the red sub-pixel R(i+1, j), the green sub-pixel G(i+1, j) and the blue sub-pixel B(i+1, j)) in P(i+1, j), the sub-pixel units (i.e., the red sub-pixel R(i, j−1), the green sub-pixel G(i, j−1) and the blue sub-pixel B(i, j−1)) in P(i, j−1), and the sub-pixel units (i.e., the red sub-pixel R(i, j+1), the green sub-pixel G(i, j+1) and the blue sub-pixel B(i, j+1)) in P(i, j+1) are all 0, i.e., black screens are displayed.

That is, the two preset patterns M provided in the present embodiments are exactly complementary. The pixel units P in two states are present in the drawings, the pixel unit P represented by a black block is an unlit pixel unit P, and the pixel unit P having three sub-pixel units is a lit pixel unit P.

For ease of understanding, for example, if one first image is implemented by drawing a panda with white chalk on a blackboard, another first image is implemented by drawing a panda with a same size and a same posture on a whiteboard with a black pen. The emergent light emitted from two complementary preset patterns at two times are used, image information of the object to be photographed 10 that cannot be obtained by the emergent light emitted at one time is usually obtained by the emergent light emitted another time. Therefore, the image of the object to be photographed 10, which is as accurate as possible, may be obtained with high efficiency by performing complementary processing on data obtained at two times through the correction algorithm.

In yet other embodiments, as shown in FIGS. 7 and 8, the first image signal is a Hadamard matrix signal.

The Hadamard matrix is an orthogonal square matrix composed of +1 and −1 elements. Here, +1 and −1 respectively correspond to the value of 1 and the value of 0 in binary encoding. That is, taking the first pixel unit P(i, j) as an example, one first image is shown in FIG. 7, and the first pixel unit P(i, j) displays black screens. Another first image is shown in FIG. 8, and the first pixel unit P(i, j) displays white screens.

In some embodiments, the electronic device may be a liquid crystal display device or a self-luminescent display device such as an organic light-emitting diode (OLED) display device, a quantum dot light-emitting diode (OLED) display device, or a polymer light-emitting diode (PLED) display device.

Figure 9:
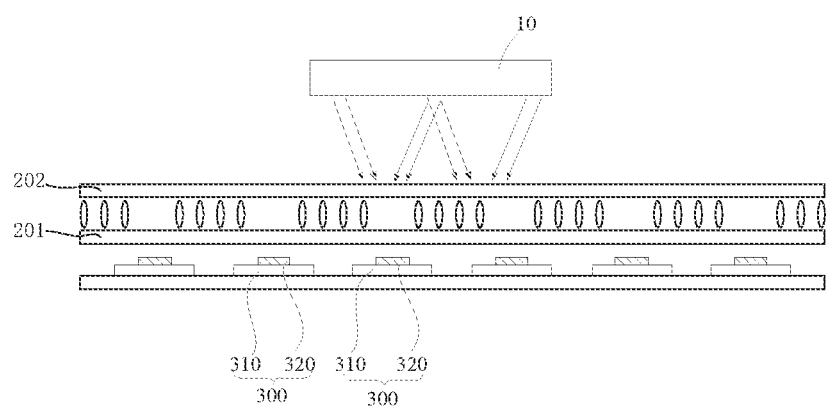
FIG. 9 is a sectional structural view of an electronic device in accordance with some other embodiments.

In a case where the electronic device is the liquid crystal display device, the pixel layer may include a pixel electrode layer, a common electrode layer, a liquid crystal layer, and a circuit layer coupled to the pixel electrode layer. The circuit layer may include a plurality of gate lines, a plurality of data lines, and a plurality of thin film transistors coupled to the gate lines and the data lines, and one thin film transistor is coupled to one pixel electrode in the pixel electrode layer. As shown in FIG. 9, the liquid crystal display device may further include a first base substrate 201 and a second base substrate 202 that sandwich the pixel layer, and both of which may include glass substrates. The first base substrate 201 is located on a side of the pixel layer 200 facing away from the light-exit side of the pixel layer 200. The photosensitive layer 300 may be disposed between the pixel layer and the first base substrate 201, or may be disposed on a side of the first base substrate 201 facing away from the pixel layer 200. As shown in FIG. 9, the photosensitive layer 300 is disposed on the side of the first base substrate 201 facing away from the pixel layer.

Figure 10:
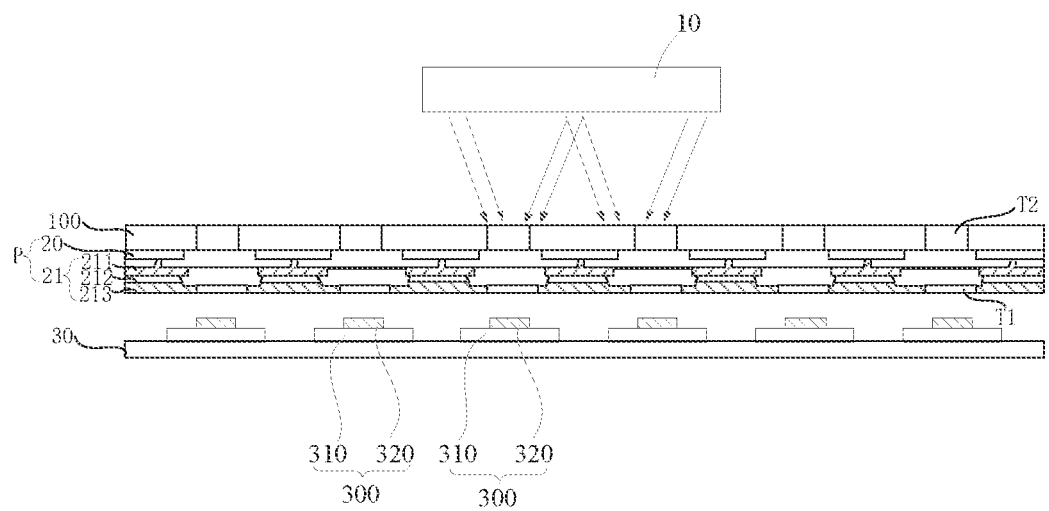
FIG. 10 is a sectional structural view of an electronic device in accordance with yet other embodiments.
Figure 11A:
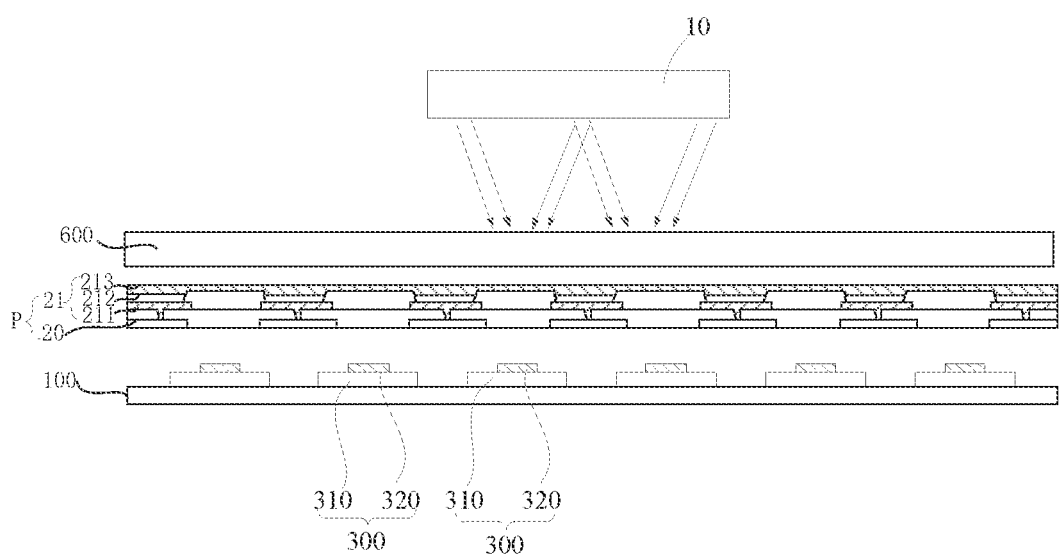
FIG. 11A is a sectional structural view of an electronic device in accordance with yet other embodiments.
Figure 11B:
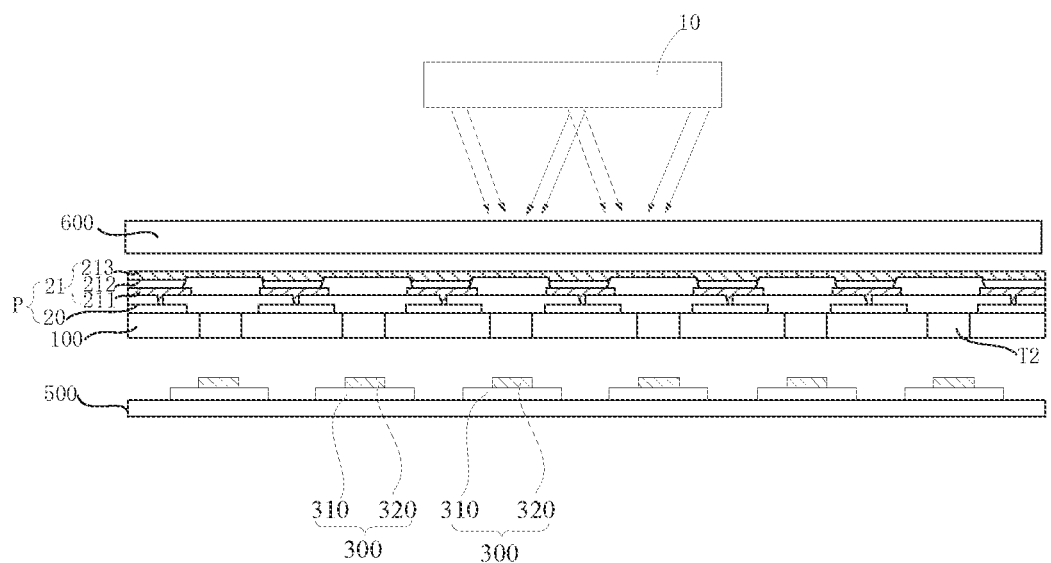
FIG. 11B is a sectional structural view of an electronic device in accordance with yet other embodiments.

In a case where the electronic device is the self-luminescent display device, as shown in FIGS. 10, 11A and 11B, the electronic device includes a base 100. Each pixel unit P includes a pixel circuit 20 and a light-emitting unit 21 that are stacked on the base 100, and the pixel circuit 20 is configured to drive the light-emitting unit 21 to emit light. The pixel circuit 20 may be a circuit with a structure of 7T1C, 6T1C or 4T1C. The light-emitting unit 21 may be a quantum dot light-emitting unit or an organic electroluminescent unit.

There are two possible cases depending on whether the display panel in the electronic device is a bottom-emission display panel or a top-emission display panel.

In a first case, as shown in FIG. 10, the light-emitting unit 21 is closer to the photosensitive layer 300 compared to the pixel circuit 20. In this case, the light-emitting unit 21 sequentially includes a first electrode layer 211, a light-emitting functional layer 212 and a second electrode layer 213 in a direction towards the photosensitive layer 300. The second electrode layer 213 is capable of reflecting light, and the second electrode layer 213 is provided with first light-transmitting portions T1 configured to transmit the reflected light.

That is, the display panel in the electronic device is the bottom-emission display panel. In this case, the first electrode layer 211 may be a transparent electrode (capable of transmitting light), and the second electrode layer 213 may be a metal electrode (incapable of transmitting light). By providing the first light-transmitting portions T1 in the second electrode layer 213, the display layer 200 may transmit the reflected light at the light-transmitting portions T1.

In this case, in some other embodiments, as shown in FIG. 10, the base 100 is disposed on a side of the pixel layer 200 away from the photosensitive layer 300. The base 100 is a transparent base, and/or the base 100 is provided with second light-transmitting portions T2 configured to transmit the reflected light and the emergent light.

In yet other embodiments, as shown in FIG. 10, the electronic device further includes an encapsulation substrate 30, and the encapsulation substrate 30 is disposed on a side of the photosensitive layer 300 facing away from the pixel layer 200. The encapsulation substrate 30 is able to protect an internal structure of the electronic device. For example, the encapsulation substrate 30 may encapsulate the photosensitive layer 300, protect the photosensitive layer 300, and improve the quality and the service life of a product. In addition, the encapsulation substrate 30 is further able to serve as a support substrate, and related component(s) are disposed on the encapsulation substrate 30, such as a photosensitive layer driving circuit 310. Moreover, for the entire pixel layer 200, the photosensitive layer 300 and the pixel layer 200 are able to share the same encapsulation substrate 30, which is able to simplify the structure.

In a second case, as shown in FIGS. 11A and 11B, the pixel circuit 20 is closer to the photosensitive layer 300 relative to the light-emitting unit 21. In this case, the light-emitting unit 21 sequentially includes a first electrode layer 211, a light-emitting functional layer 212 and a second electrode layer 213 in a direction away from the photosensitive layer 300. The second electrode layer 213 is capable of transmitting light. A difference from the first case is that the display panel in the electronic device is the top-emission display panel. In this case, the second electrode layer 213 is a transparent electrode layer. Although the second electrode layer 213 entirely covers the base 100, it is capable of transmitting light. The first electrode layer 211 is block-shaped and is disposed in each pixel unit. Therefore, there is no need to provide the first light-transmitting portions T1 in the second electrode layer 213 to achieve light transmission as in the first case. That is, the pixel layer 200 itself is of a structure capable of transmitting light.

In this case, in some other embodiments, as shown in FIGS. 11A and 11B, there are two situations depending on whether the photosensitive layer 300 is located on a side of the base 100 proximate to the pixel layer 200 or at a side of the base 100 facing away from the pixel layer 200.

In a first situation, as shown in FIG. 11A, the photosensitive layer 300 is disposed between the base 100 and the pixel layer 200. That is, the photosensitive layer 300 is located on the side of the base 100 proximate to the pixel layer 200. In this case, regardless of whether the base 100 is made of a transparent material or a non-transparent material, and whether the base 100 is provided with the second light-transmitting portions or not, the reception of the reflected light by the photosensitive layer 300 is not affected. Therefore, the material and the structure of the base 100 are not specifically limited.

In addition, in actual fabrication, the base 100 may also serve as a support substrate on which formation of the photosensitive layer 300 is completed.

In a second situation, as shown in FIG. 11B, the photosensitive layer 300 is located on the side of the base 100 facing away from the pixel layer 200. In this case, the base 100 is a transparent base (made of a transparent material), and/or the base 100 is provided with second light-transmitting portions T2 configured to transmit the reflected light. In this way, the photosensitive layer 300 may receive the reflected light through the second light-transmitting portions T2.

In some embodiments, the second light-transmitting portions T2 may be light-transmitting holes. For example, light-transmitting holes distributed in an array are used, and a diameter of the light-transmitting hole and spaces between the light-transmitting holes are specifically set according to actual needs, so that the reflected light is fully received by the photosensitive layer 300 through the light-transmitting holes. In addition, other circuits on the base 100 also need to adopt special layouts to avoid blocking the transmission of the reflected light.

In addition, in this situation, as shown in FIG. 11B, the electronic device may further include a protective layer 500 disposed on a side of the photosensitive layer 300 away from the base 100. In a specific implementation, the protective layer 500 is attached to the photosensitive layer 300, or the protective layer 500 is disposed at a position corresponding to a region where the photosensitive layer 300 is located. By providing the protective layer 500, and substantially providing the photosensitive layer 300 between the protective layer 500 and the base 100, the photosensitive layer 300 may be protected, and the quality and the service life of the product may be ensured. Circuit units such as a connection circuit and a control circuit of the photosensitive layer 300 may further be disposed in the protective layer 500, which is also beneficial to protecting these circuit units.

In a case where the protective layer 500 is a glass substrate and entirely covers the photosensitive layer 300, the protective layer 500 also is further able to serve as a support substrate on which the formation of the photosensitive layer 300 is completed.

In this case, in some other embodiments, as shown in FIGS. 11A and 11B, the electronic device may further include an encapsulation layer 600 disposed on a side of the pixel layer 200 away from the photosensitive layer 300. The encapsulation layer 600 is used to protect the pixel layer 200. The encapsulation layer 600 may be an encapsulation substrate.

It will be noted that, the electronic device may further include a structure-reinforcing frame to strengthen the structures of the pixel layer 200 and the base 100, and to improve the product quality and the service life of the display panel composed of the pixel layer 200 and the base 100.

In some embodiments, as for the top-emission display panel, as shown in FIGS. 11A and 11B, the above two situations are present. That is, the first situation is that, as shown in FIG. 11A, the photosensitive layer 300 is disposed between the base 100 and the pixel layer 200, and the second situation is that, as shown in FIG. 11B, the photosensitive layer 300 is disposed on the side of the base 100 away from the pixel layer 200. As for the first situation, since the photosensitive layer 300 and the pixel layer 200 have no blocking of other structural layers therebetween, the photosensitive layer 300 is able to more easily receive the reflected light. As for that the photosensitive layer 300 is disposed between the base 100 and the pixel layer 200, three specific cases are present. A first case is that the photosensitive layer 300 is proximate to the base 100, and is away from the pixel layer 200. A second case is that the photosensitive layer 300 is proximate to the pixel layer 200, and is away from the base 100. A third case is that the photosensitive layer 300 is exactly at the same distance from the pixel layer 200 as from the base 100. Providing the photosensitive layer 300 between the base 100 and the pixel layer 200 does not require the base 100 to be a transparent base. Therefore, during the fabrication, in a case where the base 100 is a non-transparent base, there is no need to provide the light-transmitting holes in the base 100, and the formation of the photosensitive layer 300 is convenient, so that the existing processes for manufacturing the display panel may be fully utilized, and a manufacturing cost is low.

In some embodiments, the display panel in the electronic device is the self-luminescent display panel. The image display control apparatus 400 may include a driver integrated circuit, i.e., a driver IC, such as a source driver IC, and may further include a gate driver circuit and a TCON coupled to the gate driver circuit and the source driver IC. The self-luminescent display device has a low power consumption, and the product is able to be made ultra-thin and ultra-light, with a thickness generally below 25 mm. For example, the display panel in the electronic device is an organic electroluminescent display panel. In this case, the image display control apparatus 400 may be the driver IC of an organic electroluminescent diode.

The driver IC may be integrated with the processor 401, or may be provided separately.

In some other embodiments, the processor 401 may be a computer chip with logical operation and mathematical operation functions such as a central processing unit (CPU) or a graphics processing unit (GPU), and is used to execute executable program codes, such as computer programs, to run programs corresponding to the executable program codes.

In some embodiments, as shown in FIGS. 7, 8, 10, 11A and 11B, the photosensitive layer 300 includes a plurality of photosensitive elements 320. An orthographic projection of the photosensitive element 320 on a plane where the pixel layer 200 is located is located between two adjacent pixel units P. The photosensitive element 320 is configured to receive the reflected light.

In order to better enable the photosensitive element 320 to receive the reflected light, by providing the orthographic projection of the photosensitive element 320 between the two adjacent pixel units P, there is no need to specially set a region for a front camera, and a large screen-to-body ratio is achieved. In addition, compared with the front camera set in the special region, by distributing the photosensitive elements 320 in an entire screen, an image located in the entire screen is able to be obtained, so as to avoid a problem of imaging blind regions due to that only images in regions where the photosensitive elements 320 are located can be obtained caused by concentration of the photosensitive elements 320.

In some embodiments, the photosensitive element 320 may be a complementary metal oxide semiconductor sensor, a charge-coupled device, or an organic photosensitive sensor. The complementary metal oxide semiconductor sensor is a complementary metal oxide semiconductor (CMOS) image sensor, the charge-coupled device is abbreviated as CCD, and the organic photosensitive sensor is an organic photodiode (OPD), which are all capable of collecting the reflected light well.

Connection relationships between the photosensitive elements 320 in the photosensitive layer 300 and the processor 401 are not specifically limited.

Figure 12:
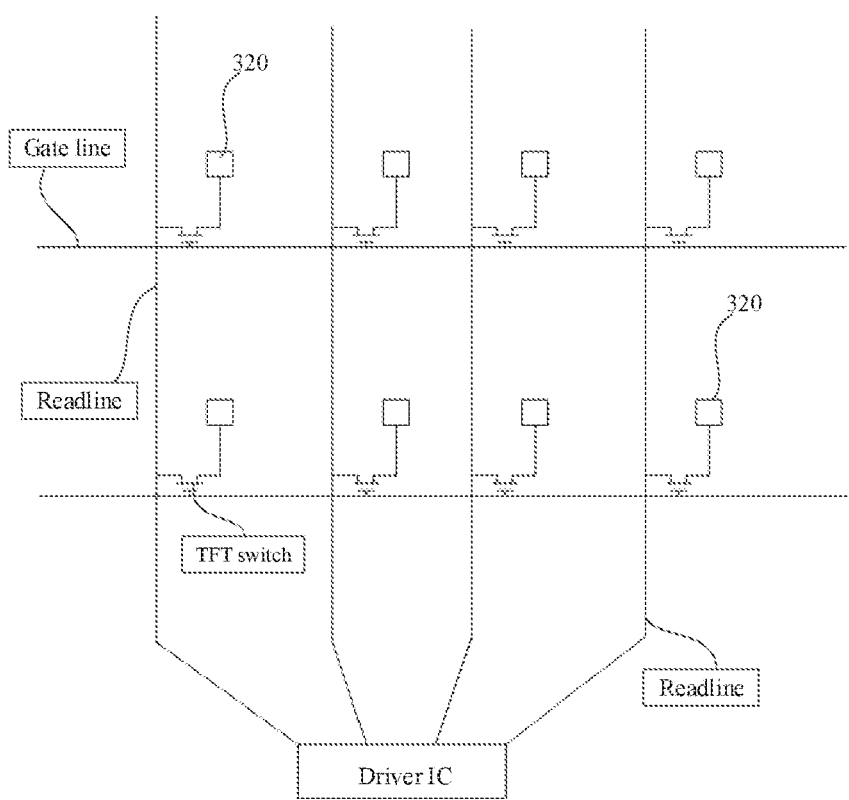
FIG. 12 is a circuit principle diagram of photosensitive elements in accordance with some embodiments.
Figure 13:
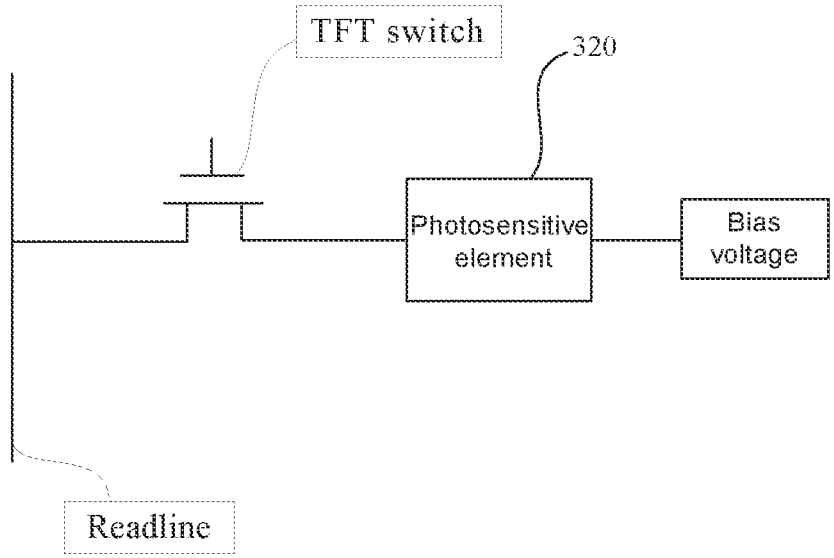
FIG. 13 is a circuit principle diagram of a photosensitive element in accordance with some other embodiments.

In some embodiments, as shown in FIGS. 12 and 13, each photosensitive element 320 corresponds to a thin film transistor (TFT) switch. The photosensitive element 320 in the drawings may be a photosensor such as a diode, a triode, or a photo resistor. A terminal of the photosensitive element 320 is connected to the TFT switch, and another terminal is connected to a bias voltage. Of course, a form of a single photosensitive element 320 is not limited. The TFT switch may not be used, and only one photosensitive element (i.e., photosensor) may be used, which needs corresponding leads and detection circuits of course, which is known to a person skilled in the art and will not be repeated. A readline is a reading line for reading the second image signal collected by the photosensitive element 320, and the processor is connected to the readlines. FIG. 12 only illustrates a solution in which the driver IC is connected to the readlines (that is, the processor is integrated with the driver IC).

In actual operation, as shown in FIG. 12, in an example where the photosensitive layer 300 includes a plurality of photosensitive elements 320 arranged in an array, the plurality of photosensitive elements 320 are scanned row by row by using gate lines in a row scanning way. When the gate line scans to a certain row, the TFT switches in the row are turned on, and then the processor collects signals at corresponding photosensitive elements 320 through the readlines. When all of the rows are scanned, complete image data of a frame may be obtained, and an image may be recovered through back-end processing.

Figure 14:
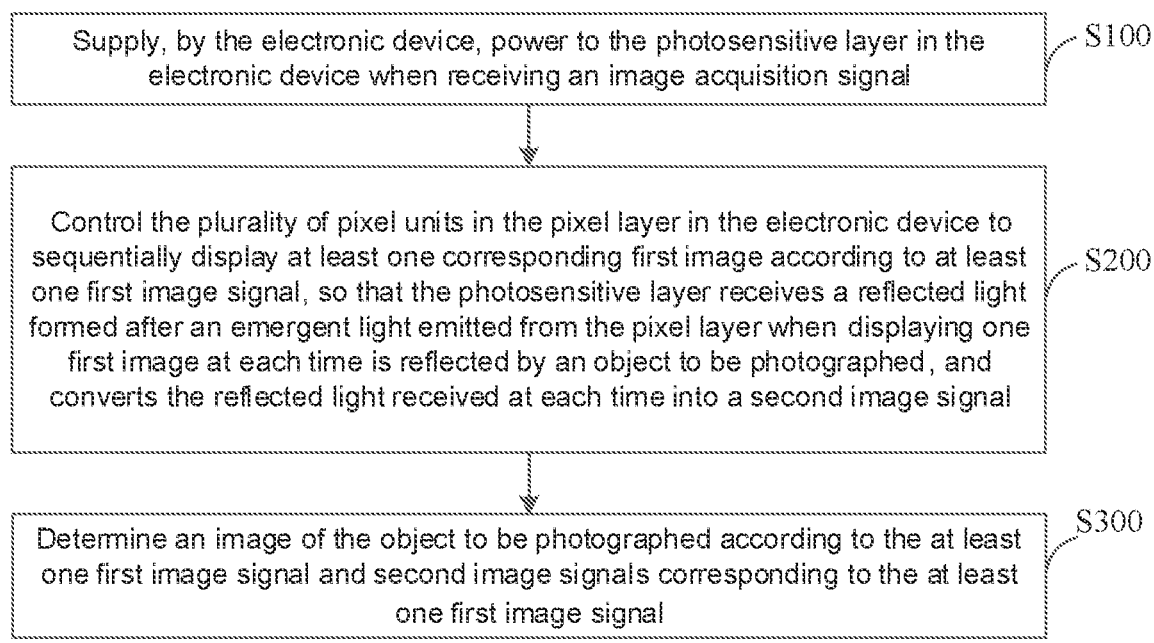
FIG. 14 is a flow diagram of an imaging method of an electronic device in accordance with some embodiments.

Some embodiments of the present disclosure provide an imaging method of the electronic device. An execution subject of the imaging method may be the electronic device or some components of the electronic device. As shown in FIG. 14, the imaging method of the electronic device includes S100 to S300.

In S100, the electronic device supplies power to the photosensitive layer 300 in the electronic device when receiving an image acquisition signal.

For example, a user sends the image acquisition signal to the electronic device by pressing a key, touching a screen, or a gesture sensing, for example, the user clicks a photographing key on a human-machine interaction interface. When receiving the image acquisition signal, the processor in the electronic device supplies power to the photosensitive layer 300 in the electronic device in response to the image acquisition signal to make the photosensitive layer 300 in a working state.

In S200, the plurality of pixel units P in the pixel layer 200 in the electronic device are controlled to sequentially display at least one corresponding first image according to at least one first image signal, so that the photosensitive layer 300 receives the reflected light formed after the emergent light emitted from the pixel layer 200 when displaying one first image at each time is reflected by the object to be photographed 10, and converts the reflected light received at each time into the second image signal.

Optionally, the image display control apparatus 400 controls the plurality of pixel units P in the pixel layer 200 in the electronic device to sequentially display the at least one corresponding first image according to the at least one first image signal.

For example, the image display control apparatus 400 controlling the plurality of pixel units to display the first image, may include: turning on at least part of the pixel units P in the pixel layer 200, and controlling the part of pixel units P to be displayed with a preset brightness and a preset color.

The at least one first image signal may be stored in the electronic device in advance.

Or, the at least one first image signal is sequentially output to the image display control apparatus 400 when the processor receives the image acquisition signal.

In some embodiments, the at least one first image signal may be preset image signal(s). That is, the first image corresponding to each first image signal has a preset pattern. For example, as shown in FIG. 3, the preset pattern M may be a light and dark pattern. That is, the preset pattern M includes a plurality of pattern blocks Q distributed in a two-dimensional direction (e.g., including a row direction and a column direction that are perpendicular to each other), and each pattern block Q corresponds to at least one pixel unit P. In a case where each pattern block Q corresponds to a plurality of pixel units P, the pixel values of these pixel units P are the same. In the row direction and in the column direction, pixel values of every two adjacent pattern blocks Q are different. The pixel value of the pattern block Q refers to the pixel value of any pixel unit P in the pattern block Q.

Further, as shown in FIG. 3, the plurality of pattern blocks Q includes a plurality of first pattern blocks Q1 and a plurality of second pattern blocks Q2 that are alternately distributed in the row direction and/or in the column direction. Y values (brightness values) corresponding to the pixel values of the first pattern blocks Q1 are the same, Y values corresponding to the pixel values of the second pattern blocks Q2 are the same, and the Y value corresponding to the pixel value of the first pattern block Q1 is different from the Y value corresponding to the pixel value of the second pattern block Q2. In this case, the preset pattern M may be a binary encoded pattern that is able to be encoded with 0 and 1.

For example, as shown in FIG. 4, the first pattern block Q1 corresponds to a black screen. That is, the brightness value corresponding to the pixel value of the first pattern block Q1 is a minimum brightness value, which may correspond to a value of 0 in binary encoding during an encoding. The second pattern block Q2 corresponds to a white screen. Thetis, the brightness value corresponding to the pixel value of the second pattern block Q2 is a maximum brightness value, which corresponds to a value of 1 in binary encoding during the encoding. Of course, as shown in FIG. 5, the second pattern block Q2 may also be a red screen (that is, a brightness value corresponding to a pixel value of the red sub-pixel of each pixel unit P in each second pattern block Q2 is a maximum brightness value, and brightness values corresponding to pixel values of the green sub-pixel G and the blue sub-pixel B are minimum brightness values).

In a case where the first pattern block Q1 corresponds to the black screen and the second pattern block Q2 corresponds to the white screen, the pixel unit(s) P in the first pattern block Q1 are not lit, and the pixel unit(s) P in the second pattern block Q2 are lit. In this case, FIG. 6 is a structural diagram of another possible preset pattern M. Widths W (dimensions in the column direction) of each first pattern block Q1 and each second pattern block Q2 that are in a same row are the same, and lengths L (dimensions in the row direction) of each first pattern block Q1 and each second pattern block Q2 that are in a same column are the same.

In an imaging process, an imaging principle of using the light and dark preset pattern that the first image displayed on the pixel layer 200 has to irradiate the object to be photographed 10 is the same as that of using a mask to shield partial regions of the object to be photographed 10. During imaginal, when the emergent light emitted from lit pixel units P in the preset pattern irradiates the object to be photographed 10, the reflected light formed through the reflection of the object to be photographed 10 is received by the photosensitive layer 300. Unlit pixel units P in the preset pattern are in a dark state, and thus no light irradiates the object to be photographed 10, and in this case, no reflected light is received by the photosensitive layer 300. That is, portions of the object to be photographed 10 that are not irradiated by light may be regarded as portions of the object to be photographed 10 that are shielded by the mask. That is, in the present embodiments, a stacked pattern of the preset pattern and the object to be photographed 10 may be obtained without a mask (also referred to as a standard pattern plate). Compared with that a mask with a preset pattern needs to be formed when lensless imaging is adopted, the electronic device is able to be made lighter and thinner, and user experience can be improved.

Optionally, the emergent light corresponding to the first image signal irradiates the object to be photographed 10, and is reflected by the object to be photographed 10 to generate the reflected light. The reflected light returns to the electronic device, and is received by the photosensitive layer 300 in the electronic device. In order to facilitate the processor to process the received reflected light, the photosensitive layer 300 converts the reflected light into the second image signal. The processor is electrically connected to the photosensitive layer 300, and thus the processor obtains the second image signal. That is, after the light and dark preset pattern that the first image displayed on the pixel layer 200 has is used to irradiate the object to be photographed 10, the second image signal obtained from the reflected light formed through the reflection of the object to be photographed 10 has pattern information of light and dark corresponding to the preset pattern. The above process may be regarded as a mask operation on a matrix (usually referred to as a convolution operation). In an example where the matrix is a binary image composed of 0 and 1, during calculation, an intermediate image signal (i.e., the second image signal) may be mathematically abstracted to a matrix Y, and the emergent light irradiates the object to be photographed 10 and is reflected by the object to be reflected 10 to obtain the intermediate image signal. The intermediate image signal contains both the first image signal and information of the object to be photographed 10, which are stacked to form the second image signal. The image of the object to be photographed 10 itself may be mathematically abstracted to a matrix I, the preset pattern may be mathematically abstracted to a matrix A, and in this case, there is a relational expression, i.e., Y=A*I. Since the preset pattern is a known matrix, and Y is also a known matrix, by reconstructing the image signal through the relational expression and then through inversion, the image of the object to be photographed 10 may be obtained, thereby achieving the imaging of the object to be photographed 10.

In some other embodiments, controlling the plurality of pixel units P to sequentially display the at least one corresponding first image according to the at least one first image signal, includes: controlling the plurality of pixel units P to sequentially display at least two corresponding first images according to at least two different first image signals.

In the present embodiments, the image display control apparatus 400 obtains the at least two different first image signals, and the at least two corresponding first images are sequentially displayed according to the at least two first image signals, and one first image corresponds to one preset pattern. That is, stacked patterns of at least two different preset patterns and the object to be photographed 10 may be obtained according to the different preset patterns, so that an accurate image of the object to be photographed 10 may be obtained as possible by performing data processing on a plurality of obtained image signals of the object to be photographed 10 through a correction algorithm.

The correction algorithm is to compare and correct a plurality of sampling results in a statistical manner to obtain a more accurate result. The specific correction algorithm is known to a person skilled in the art, which will not be repeated herein. The first image signal in the present application is able to be expressed by controlling the pixel layer 200 by the image display control apparatus 400, and the second image signal is obtained according to the emergent light emitted from the first image corresponding to the first image signal. The preset pattern displayed with the emergent light is able to be changed arbitrarily (although the preset pattern is able to be changed arbitrarily, it is a known preset pattern). The at least two first image signals are used to emit the emergent light at at least two times, and the emergent light emitted at at least two times irradiate the same object to be photographed 10 to correspondingly obtain the reflected light at at least two times, thereby obtaining at least two second image signals, which reduces image noises, and errors through the correction algorithm by the processor, so as to obtain an image closer to the actual object to be photographed 10.

In order to form a specific known pattern, the image display control apparatus 400 first controls the pixel units P in the pixel layer 200 to make the pixel layer 200 display normally. This display control is to make at least part of the pixel units P work, so as to form the specific pattern.

In addition, the image display control apparatus 400 controlling the plurality of pixel units P to sequentially display the at least two corresponding first images according to the at least two different first image signals, may be that: the image display control apparatus 400 controls the plurality of pixel units P to display two first images at a preset frequency (e.g., a second), or controls the plurality of pixel units P to display three first images at a second, or to display a screen at a play frequency of an actual displayed display screen, such as 24 frames per second (that is, 24 first images are displayed at a second), and each first image corresponds to one preset pattern.

In some other embodiments, each pixel unit P includes a plurality of sub-pixel units (such as the red sub-pixel R, the green sub-pixel G, and the blue sub-pixel B described above). The at least two different first images signals are two first image signals. The at least two first images are two first images. The electronic device has 0 to N levels of gray scales, and a sum of gray scales corresponding to a same sub-pixel unit in the two first images is N, and N is a maximum gray scale.

For example, an array of pixel units P in a same region or a same region in an array of pixel units P is abbreviated as a pixel array region. FIG. 7 illustrates an example of one first image displayed in a certain pixel array region, and FIG. 8 illustrates an example of another first image displayed in the same pixel array region.

In FIGS. 7 and 8, in an example where one of the plurality of pixel units P is represented by P(i, j), the pixel unit is denoted as a first pixel unit, the sub-pixel units in the first pixel unit are represented by the red sub-pixel R(i, j), the green sub-pixel G(i, j) and the blue sub-pixel B(i, j), respectively.

Four pixel units adjacent to the first pixel unit in the row direction and in the column direction are present in the plurality of pixel units F, which are represented by P(i−1, j), P(i+1, j), P(i, j−1) and P(i, j+1). Accordingly, the sub-pixel units in P(i−1, j) are represented by the red sub-pixel R(i−1, j), the green sub-pixel G(i−1, j) and the blue sub-pixel B(i−1, j), respectively. The sub-pixel units in P(i+1, j) are represented by the red sub-pixel R(i+1, j), the green sub-pixel G(i+1, j) and the blue sub-pixel B(i+1, j), respectively. The sub-pixel units in P(i, j−1) are represented by the red sub-pixel R(i, j−1), the green sub-pixel G(i, j−1) and the blue sub-pixel B(i, j−1), respectively. The sub-pixel units in P(i, j+1) are represented by the red sub-pixel R(i, J+1), the green sub-pixel G(i, j+1) and the blue sub-pixel B(i, j+1), respectively.

In one first image, as shown in FIG. 7, in a case where gray scales of the sub-pixel units (i.e., the red sub-pixel R(i, j), the green sub-pixel G(i, j) and the blue sub-pixel B(i, j)) in the first pixel unit P(i, j) are all 0, i.e., in a case where black screens are displayed, gray scales of the sub-pixel units (i.e., the red sub-pixel R(i−1, j), the green sub-pixel G(i−1, j) and the blue sub-pixel B(i−1, j)) in P(i−1, j), the sub-pixel units (i.e., the red sub-pixel R(i+1, j), the green sub-pixel G(i+1, j) and the blue sub-pixel B(i+1, j)) in P(i+1, j), the sub-pixel units (i.e., the red sub-pixel R(i, j−1), the green sub-pixel G(i, j−1) and the blue sub-pixel B(i, j−1)) in P(i, j−1), and the sub-pixel units (i.e., the red sub-pixel R(i, j+1), the green sub-pixel G(i, j+1) and the blue sub-pixel B(i, j+1)) in P(i, j+1) are all 255, i.e., white screens are displayed.

In another first image, as shown in FIG. 8, in a case where gray scales of the sub-pixel units (i.e., the red sub-pixel R(i, j), the green sub-pixel G(i, j) and the blue sub-pixel B(i, j)) in the first pixel unit P(i, j) are all 255, i.e., in a case where white screens are displayed, gray scales of the sub-pixel units (i.e., the red sub-pixel R(i−1, j), the green sub-pixel G(i−1, j) and the blue sub-pixel B(i−1, j)) in P(i−1, j), the sub-pixel units (i.e., the red sub-pixel R(i+1, j), the green sub-pixel G(i+1, j) and the blue sub-pixel B(i+1, j)) in P(i+1, j), the sub-pixel units (i.e., the red sub-pixel R(i, j−1), the green sub-pixel G(i, j−1) and the blue sub-pixel B(i, j−1)) in P(i, j−1), and the sub-pixel units (i.e., the red sub-pixel R(i, j+1), the green sub-pixel G(i, j+1) and the blue sub-pixel B(i, j+1)) in P(i, j+1) are all 0, i.e., black screens are displayed.

That is, the two preset patterns M provided in the present embodiments are exactly complementary. The pixel units P in two states are present in the drawings, the pixel unit P represented by a black block is an unlit pixel unit P, and the pixel unit P having three sub-pixel units is a lit pixel unit P.

For example, when a panda is displayed, a part of the pixel units are controlled to display white portions of the panda with a certain brightness and a white color, and another part of the pixel units does not work to form black portions of the panda, which appears as the panda as a whole. Of course, brightnesses and colors can form more patterns. That is, the first image may be a color image or a black-and-white image, which is not limited herein.

As for the two specific patterns in the present embodiments, as shown in FIGS. 7 and 8, the displayed patterns are complementary, which is beneficial to application of the correction algorithm. In addition, the object to be photographed 10 may be irradiated at two angles to obtain images of the object to be photographed 10 at different positions, so as to obtain more accurate image information of the object to be photographed 10.

In S300, the image of the object to be photographed 10 is determined according to the at least one first image signal and the second image signals corresponding to the at least one first image signal.

For example, the processor 401 may determine the matrix I according to the first image signal that has been known in advance (i.e., the matrix A), the second image signal (i.e., the matrix Y) received and converted by the photosensitive layer 300 and the above mathematical relational expression, thereby determining image information of the object to be photographed 10 and converting the image information into the image of the object to be photographed 10.

The reflected light reflected at each time corresponds to one second image signal. That is, the emergent light and the reflected light that are emitted at each time, and the second image signal are in one-to-one correspondence. During processing, the first image signal and the second image signal corresponding to the emergent light emitted this time are processed correspondingly. That is, in a case where there are at least two first image signals, and the emergent light is emitted at two times according to the first image signals, the first image signal and the second image signal corresponding to the emergent light emitted at one time should be subjected to the above decoding processing, and the second image signal corresponding to the emergent light emitted at one time and the first image signal corresponding to the emergent light emitted at another time should not be subjected to the above decoding operation. In addition, by using the emergent light emitted at at least two times to irradiate the object to be photographed 10 at at least two times and at a plurality of angles to obtain the image of the object to be photographed 10 through the correction algorithm in a statistical method, more detailed information may be obtained. Moreover, during the processing, image noises and errors may be reduced, and an image closer to the actual object to be photographed 10 may be obtained.

In yet other embodiments, after the electronic device determines the image of the object to be photographed 10, the imaging method further includes: the electronic device transmitting the image of the object to be photographed 10 to the image display control apparatus 400, so that the image display control apparatus 400 controls the plurality of pixel units to display the determined image of the object to be photographed 10.

That is, after determining the image of the object to be photographed 10, the processor 401 may transmit the image of the object to be photographed 10 to the image display control apparatus 400, so that the image display control apparatus 400 controls the plurality of pixel units to display the determined image of the object to be photographed 10. For example, in a case where the electronic device is a mobile phone, displaying the determined image of the object to be photographed 10 on the electronic device is to display the determined image of the object to be photographed 10 on a display screen of the mobile phone, and the captured image of the object to be photographed 10 may be stored in a storage unit (e.g., an album) in the mobile phone.

It will be noted that, due to a physical structure, if the photosensitive layer 300 is disposed near the pixel layer 200, it is inevitable to obtain an emergent light directly from the pixel layer 200, and this part of emergent light is not reflected by the object to be photographed 10. An image signal corresponding to this part of emergent light is also known, and may be removed through error correction when performing mathematical operations.

A person skilled in the art will understand that, steps, measures and solutions in various operations, methods and processes that have been discussed in the present application may be alternated, changed, combined, or deleted. Optionally, other steps, measures and solutions in various operations, methods and processes that have been discussed in the present application may also be alternated, changed, rearranged, decomposed, combined, or deleted. Optionally, steps, measures and solutions in various operations, methods and processes that are disclosed in the present application in the prior art may also be alternated, changed, rearranged, decomposed, combined, or deleted.

In the description of the specification, the specific features, structures, materials or characteristics may be combined in any one or more embodiments or examples in a suitable manner.

The forgoing descriptions are merely some implementations of the present application. It will be pointed out that, a person of ordinary skill in the art may also make numerous improvements and modifications without departing from the principle of the present application, which shall also be considered to be within the protection scope of the present application.

The forgoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An electronic device, comprising:
   a pixel layer including a plurality of pixel units, the plurality of pixel units being configured to display an image;
   an image display control apparatus electrically connected to the pixel layer and configured to control the plurality of pixel units in the pixel layer to sequentially display at least one corresponding first image according to at least one first image signal;
   a photosensitive layer located on a side of the pixel layer facing away from a light-exit side of the pixel layer, the photosensitive layer being configured to receive a reflected light formed after an emergent light emitted from the pixel layer when displaying one first image at each time is reflected by an object to be photographed, and to convert the reflected light received at each time into a second image signal; and
   a processor electrically connected to the photosensitive layer and configured to determine an image of the object to be photographed according to the at least one first image signal and second image signals corresponding to the at least one first image signal;
   the electronic device further comprising a base;
   wherein each pixel unit includes a pixel circuit and a light-emitting unit that are stacked on the base, and the pixel circuit is configured to drive the light-emitting unit to emit light;
   wherein the light-emitting unit is closer to the photosensitive layer relative to the pixel circuit;
   the light-emitting unit includes a first electrode layer, a light-emitting functional layer and a second electrode layer that are sequentially arranged in a direction towards the photosensitive layer, the second electrode layer is capable of reflecting light, and the second electrode layer is provided with first light-transmitting portions configured to transmit the reflected light received at each time;
   the base is provided with second light-transmitting portions configured to transmit the reflected light received at each time and the emergent light, and the second light-transmitting portions are light-transmitting holes distributed in an array.

2. The electronic device according to claim 1, further comprising an encapsulation substrate disposed on a side of the photosensitive layer facing away from the pixel layer.

3. The electronic device according to claim 1, wherein the photosensitive layer includes a plurality of photosensitive elements, and an orthographic projection of each photosensitive element is located between two adjacent pixel units on a plane where the pixel layer is located.

4. The electronic device according to claim 1, wherein the processor is further configured to sequentially output the at least one first image signal to the image display control apparatus when receiving an image acquisition signal.

5. The electronic device according to claim 1, wherein the processor is further configured to transmit the image of the object to be photographed to the image display control apparatus after determining the image of the object to be photographed;

the image display control apparatus is further configured to control the pixel layer to display the determined image of the object to be photographed.

6. The electronic device according to claim 1, wherein each first image signal is a preset image signal.

7. The electronic device according to claim 1, wherein each pixel unit includes a plurality of sub-pixel units;
the image display control apparatus is configured to control the plurality of pixel units to sequentially display two corresponding first images according to two first image signals;
the electronic device has 0 to N levels of gray scales, and a sum of gray scales corresponding to a same sub-pixel unit in the two first images is N, wherein N is a maximum gray scale.

8. The electronic device according to claim 1, wherein a first image signal in the at least one first image signal is a Hadamard matrix signal.

* * * * *